US011770227B2

(12) United States Patent
Chen et al.

(10) Patent No.: US 11,770,227 B2
(45) Date of Patent: Sep. 26, 2023

(54) TECHNIQUES FOR SPATIAL DIVISION MULTIPLEXED UPLINK TRANSMISSIONS ASSOCIATED WITH SOUNDING REFERENCE SIGNAL RESOURCE SETS SCHEDULED BY A DOWNLINK CONTROL INFORMATION FORMAT

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/647,918

(22) Filed: Jan. 13, 2022

(65) Prior Publication Data

US 2023/0224119 A1 Jul. 13, 2023

(51) Int. Cl.
  *H04L 5/00* (2006.01)

(52) U.S. Cl.
  CPC .......... *H04L 5/0051* (2013.01); *H04L 5/0053* (2013.01)

(58) Field of Classification Search
  CPC ..................... H04L 5/0051; H04L 5/0053
  See application file for complete search history.

(56) References Cited

U.S. PATENT DOCUMENTS

2019/0274155 A1* 9/2019 Bhattad .................. H04L 5/0048

FOREIGN PATENT DOCUMENTS

WO 2021133576 A1 7/2021

OTHER PUBLICATIONS

International Search Report and Written Opinion—PCT/US2022/080641—ISA/EPO—dated Apr. 24, 2023.
Moderator (Huawei): "Summary #1 of Email Discussion [105-e-NR-L1enh-URLLC-01] on Remaining Issues on PDCCH Enhancements", 3GPP TSG RAN WG1 Meeting #105-e, R1-2106361, 3rd Generation Partnership Project, Mobile Competence Centre, 650, Route Des Lucioles, F-06921 Sophia-Antipolis Cedex, France, vol. RAN WG1, No. E-meeting, May 10-27, 2021, May 28, 2021, XP052017057, 64 Pages.

* cited by examiner

*Primary Examiner* — Ronald B Abelson
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may receive a sounding reference signal (SRS) configuration indicating a first SRS resource set that includes $N_{SRS,0\_2}^{1}$ SRS resources and a second SRS resource set that includes $N_{SRS,0\_2}^{2}$ SRS resources, the first SRS resource set and the second SRS resource set being configured for uplink transmissions scheduled by a second downlink control information (DCI) format. The UE may transmit an uplink transmission scheduled using the second DCI format, the uplink transmission being transmitted based at least in part on the SRS configuration. Numerous other aspects are described.

24 Claims, 9 Drawing Sheets

SRS resource sets in srs-ResourceSetToAddModList for DCI format 0_1

SRS resource set 1: $N^1_{SRS} = 4, N^1_{SRS-SDM} = 2$

SRS resource set 2: $N^2_{SRS} = 4, N^2_{SRS-SDM} = 2$

SRS resource sets in srs-ResourceSetToAddModListDCI-0-2 for DCI format 0_2

$N^1_{SRS,0\_2} = 3$
$\min(N^1_{SRS-SDM}, N^1_{SRS,0\_2}) = 2$ $N^2_{SRS,0\_2} = 3$
$\min(N^2_{SRS-SDM}, N^2_{SRS,0\_2}) = 2$

TECHNIQUES FOR SPATIAL DIVISION MULTIPLEXED UPLINK TRANSMISSIONS ASSOCIATED WITH SOUNDING REFERENCE SIGNAL RESOURCE SETS SCHEDULED BY A DOWNLINK CONTROL INFORMATION FORMAT

FIELD OF THE DISCLOSURE

Aspects of the present disclosure generally relate to wireless communication and to techniques and apparatuses for spatial division multiplexed (SDM) uplink transmissions associated with sounding reference signal (SRS) resource sets scheduled by a downlink control information (DCI) format.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving a sounding reference signal (SRS) configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second downlink control information (DCI) format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS-SDM}^1$ SRS resources of the third SRS resource set and $N_{SRS-SDM}^2$ resources of the fourth SRS resource set are configured for spatial division multiplexed (SDM) uplink communications scheduled by the first DCI format. The method may include transmitting an uplink transmission scheduled using the second DCI format, the uplink transmission being transmitted based at least in part on the SRS configuration.

Some aspects described herein relate to a method of wireless communication performed by a base station. The method may include transmitting a SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS-SDM}^1$ SRS resources of the third SRS resource set and $N_{SRS-SDM}^2$ resources of the fourth SRS resource set are configured for SDM uplink communications scheduled by the first DCI format. The method may include receiving an uplink transmission scheduled using the second DCI format, the uplink transmission being received based at least in part on the SRS configuration.

Some aspects described herein relate to a UE for wireless communication. The user equipment may include a memory and one or more processors coupled to the memory. The one or more processors may be configured to receive a SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS-SDM}^1$ SRS resources of the third SRS resource set and $N_{SRS-SDM}^2$ resources of the fourth SRS resource set are configured for SDM uplink communications scheduled by the first DCI format. The one or more processors may be configured to transmit an uplink transmission scheduled using the second DCI format, the uplink transmission being transmitted based at least in part on the SRS configuration.

Some aspects described herein relate to a base station for wireless communication. The base station may include a memory and one or more processors coupled to the memory. The one or more processors may be configured to transmit a SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format. The one or more processors may be configured to receive an uplink transmission scheduled using the second DCI format, the uplink transmission being received based at least in part on the SRS configuration.

Some aspects described herein relate to a non-transitory computer-readable medium that stores a set of instructions for wireless communication by a UE. The set of instructions, when executed by one or more processors of the UE, may cause the UE to receive a SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format. The set of instructions, when executed by one or more processors of the UE, may cause the UE to transmit an uplink transmission scheduled using the second DCI format, the uplink transmission being transmitted based at least in part on the SRS configuration.

Some aspects described herein relate to a non-transitory computer-readable medium that stores a set of instructions for wireless communication by a base station. The set of instructions, when executed by one or more processors of the base station, may cause the base station to transmit a SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format. The set of instructions, when executed by one or more processors of the base station, may cause the base station to receive an uplink transmission scheduled using the second DCI format, the uplink transmission being received based at least in part on the SRS configuration.

Some aspects described herein relate to an apparatus for wireless communication. The apparatus may include means for receiving a SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format. The apparatus may include means for transmitting an uplink transmission scheduled using the second DCI format, the uplink transmission being transmitted based at least in part on the SRS configuration.

Some aspects described herein relate to an apparatus for wireless communication. The apparatus may include means for transmitting a SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, where the $N_{SRS,0\_2}^1$ SRS resources of the first SRS resource set are a first $N_{SRS,0\_2}^1$ resources from a third SRS resource set that includes $N_{SRS}^1$ resources, where the $N_{SRS,0\_2}^2$ SRS resources of the second SRS resource set are a first $N_{SRS,0\_2}^1$ resources from a fourth SRS resource set that includes $N_{SRS}^2$ resources, where the third SRS resource set and the fourth SRS resource set are configured for uplink transmissions scheduled by a first DCI format, and where $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format. The apparatus may include means for receiving an uplink transmission scheduled using the second DCI format, the uplink transmission being received based at least in part on the SRS configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
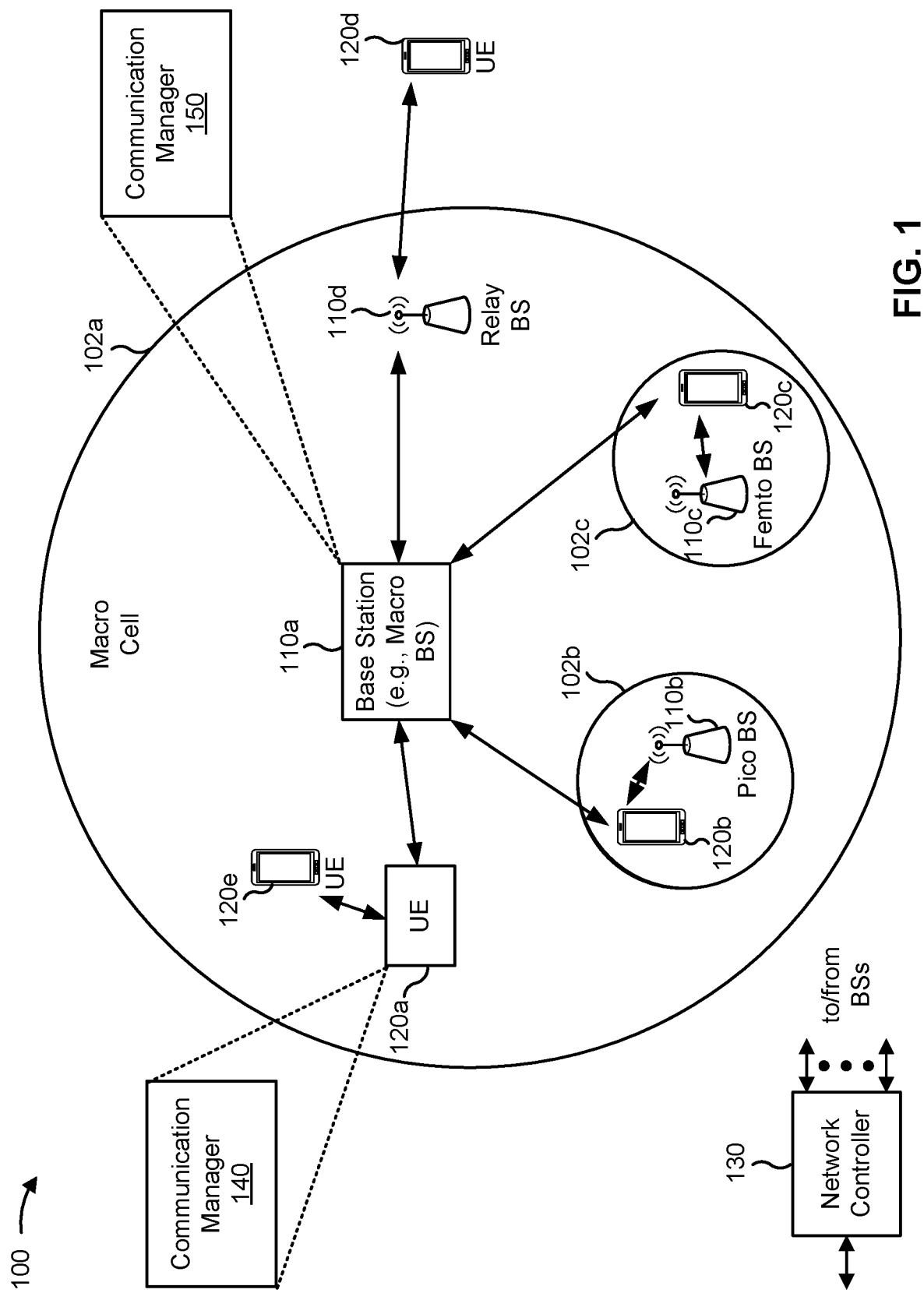
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges In some aspects, the UE 120 may include a communication manager 140. As described in more detail elsewhere herein, the communication manager 140 may receive an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for SDM uplink communications scheduled by the first DCI format; may transmit an uplink transmission scheduled using the second DCI format, the uplink transmission being transmitted based at least in part on the SRS configuration. Additionally, or alternatively, the communication manager 140 may perform one or more other operations described herein.

In some aspects, the base station 110 may include a communication manager 150. As described in more detail elsewhere herein, the communication manager 150 may transmit an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for SDM uplink communications scheduled by the first DCI format; and may receive an uplink transmission scheduled using the second DCI format, the uplink transmission being received based at least in part on the SRS configuration. Additionally, or alternatively, the communication manager 150 may perform one or more other operations described herein.

As indicated above, FIG. 1 is provided as an example. Other examples may differ from what is described with regard to FIG. 1.

Figure 2:
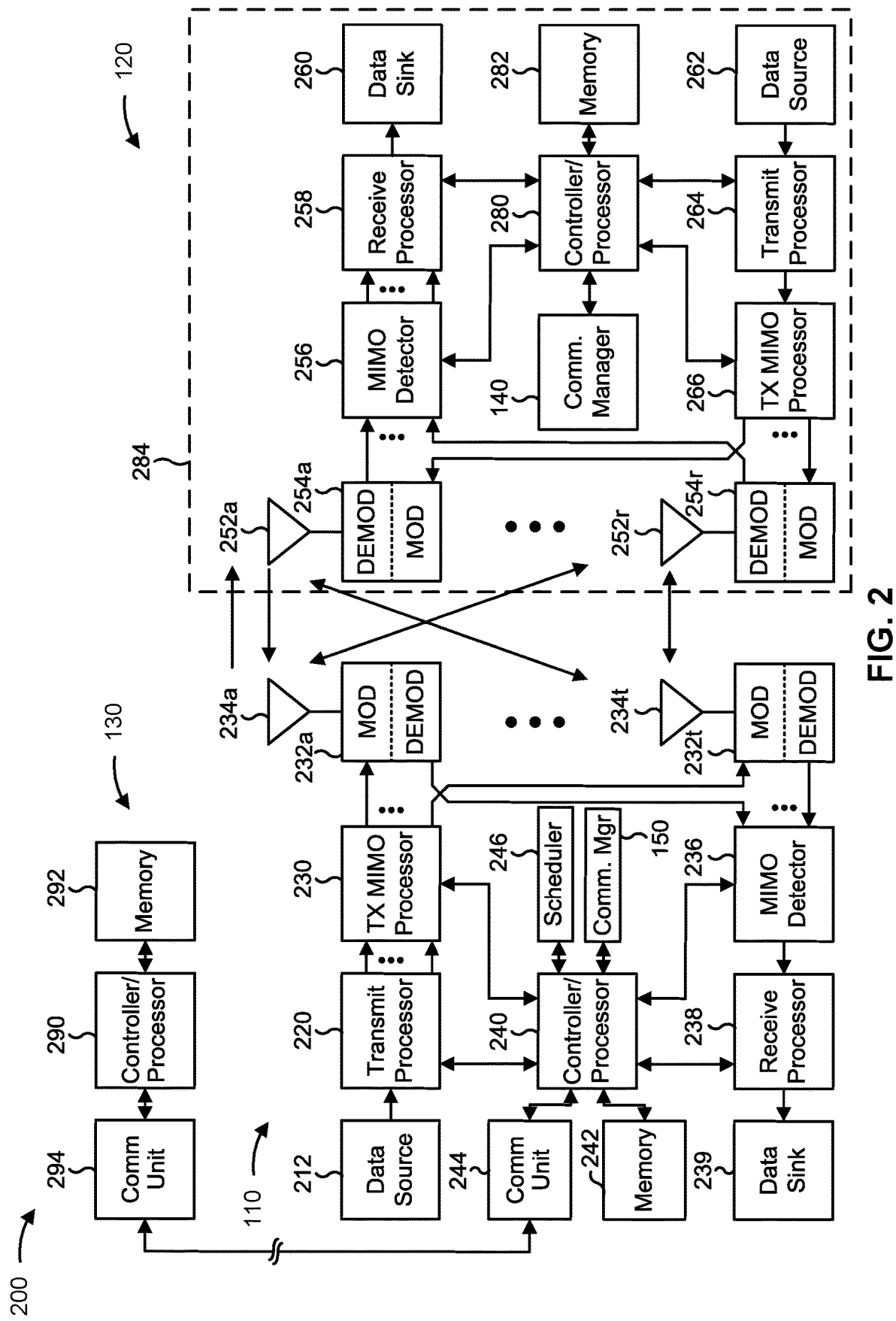
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3A-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3A-7).

The controller/processor 240 of the base station 110, the controller/processor 280 of the UE 120, and/or any other component(s) of FIG. 2 may perform one or more techniques associated with SDM uplink transmissions associated with SRS resource sets scheduled by a DCI format, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

In some aspects, UE 120 may include means for receiving an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for SDM uplink communications scheduled by the first DCI format; means for transmitting an uplink transmission scheduled using the second DCI format, the uplink transmission being transmitted based at least in part on the SRS configuration; or the like. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, base station 110 may include means for transmitting an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for SDM uplink communications scheduled by the first DCI format; means for receiving an uplink transmission scheduled using the second DCI format, the uplink transmission being received based at least in part on the SRS configuration; or the like. In some aspects, such means may include one or more components of base station 110 described in connection with FIG. 2, such as antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A wireless communication system may support codebook-based uplink transmissions (e.g., codebook-based physical uplink shared channel (PUSCH) transmissions) and non-codebook-based uplink transmissions (e.g., non-codebook-based PUSCH transmissions). For codebook-based uplink transmission, a UE can be configured with one sounding reference signal (SRS) resource set with a "usage" set to "codebook." Generally, a maximum of four SRS resources within the SRS resource set can be configured for the UE, where each SRS resource is configured (e.g., via radio resource control (RRC) signaling) with a number of ports (e.g., nrofSRS-Ports). An SRS resource indicator (SRI) field included in downlink control information (DCI) that schedules an uplink transmission indicates one SRS resource. Here, a number of ports configured for the indicated SRS resource determines number of antenna ports for the uplink transmission, and the uplink transmission is transmitted with the same spatial domain filter (i.e., uplink beam) as the indicated SRS resource. A number of layers (i.e., a rank) and a transmit precoding matrix indicator (TPMI) for the scheduled uplink transmission are determined from another DCI field. For non-codebook-based uplink transmissions, a UE can be configured with one SRS resource set with "usage" set to "non-codebook." Generally, a maximum of four SRS resources within the SRS resource set can be configured for the UE, where each SRS resource has one port. An SRI field in DCI that schedules an uplink transmission indicates one or more SRS resources. Here, a number of indicated SRS resources determines the rank for the scheduled uplink transmission, and the uplink transmission is transmitted with the same precoder and spatial domain filter (i.e., uplink beam) as the indicated SRS resources. Notably, for both codebook-based uplink transmissions and non-codebook-based uplink transmissions, a size of the SRI field is a function of number of SRS resources within the SRS resource set.

DCI format 0_2 may be utilized for scheduling uplink transmissions (e.g., PUSCH transmissions) in some wireless communication systems. One purpose of DCI format 0_2 is to reduce a size of DCI (e.g., as compared to, for example, DCI format 0_1) by decreasing a number of bits needed for each DCI field through RRC configuration. Notably, SRS resource sets for codebook-based and/or non-codebook-based uplink transmissions can be configured separately for uplink transmissions scheduled by DCI format 0_2 via an RRC parameter (e.g., srs-ResourceSetToAddModListDCI-0-2, where an RRC parameter srs-ResourceSetToAddModList is used for DCI format 0_1). For codebook-based uplink transmissions, only one SRS resource set with usage set to "codebook" can be configured by the RRC parameter, and for non-codebook-based uplink transmissions only one SRS resource set with usage set to "non-codebook" can be configured by the RRC parameter. Here, a comparatively smaller number of SRS resources ($N_{SRS,0\_2}$) within an SRS resource set can be configured, which reduces an SRI bitwidth. However, the $N_{SRS,0\_2}$ SRS resources within the SRS resource set for DCI format 0_2 need to be the first $N_{SRS,0\_2}$ SRS resources within the SRS resource set for DCI format 0_1 in order to ensure that UE complexity is not increased. That is, to avoid an increase in complexity at the UE, the $N_{SRS,0\_2}$ SRS resources within the SRS resource set for DCI format 0_2 are a subset of SRS resources in the SRS resource set configured for DCI format 0_1.

Additionally, some wireless communication systems support single-DCI based uplink repetition (e.g., PUSCH repetition) in a time-division multiplexed (TDM) manner, where transmission parameters (e.g., beam/spatial relation, power control, precoding, or the like) vary among sets of uplink repetition. For example, uplink repetitions scheduled by a single DCI can belong to two sets, and each set of uplink repetitions has a corresponding set of transmission parameters. To achieve this, the two sets of repetitions, and therefore the two sets of transmission parameters, correspond to two SRS resource sets. In operation, a DCI indicates two sets of transmission parameters through two corresponding SRI fields (e.g., for both codebook-based and non-codebook-based transmissions) to enable single-DCI based PUSCH repetition in a TDM manner.

Further, some wireless communication systems support multi transmission/reception point (mTRP) uplink repetition schemes for codebook-based and non-codebook-based uplink transmissions. In such a scheme, SRS resource sets applicable for mTRP uplink transmissions scheduled by DCI format 0_1 or DCI format 0_2 are defined by entries of a group of higher layer parameters—srs-ResourceSetToAddModList and srs-ResourceSetToAddModListDCI-0-2, respectively. A given SRS resource set configured by the higher layer parameter associated with DCI format 0_2 (e.g., srs-ResourceSetToAddModListDCI-0-2) is composed of the first $N_{SRS,0\_2}$ SRS resources in the given SRS resource set configured by the higher layer parameter associated with DCI format 0_1 (e.g., srs-ResourceSetToAddModList). In operation, the presence of a DCI field for dynamic switching is separately determined for DCI format 0_1 and DCI format 0_2 (e.g., based on whether two SRS resource sets are configured for that DCI format). Additionally, for mTRP uplink repetition scheduled with DCI format 0_2, the value of $N_{SRS,0\_2}$ in two SRS resource sets configured by the higher layer parameter associated with DCI format 0_2 should be the same. It follows that, for mTRP uplink repetition, when two SRS resource sets are configured in the parameter associated with DCI format 0_2 (e.g., srs-ResourceSetToAddModListDCI-0-2) and there is only one SRS resource set configured in the parameter associated with DCI format 0_1 (e.g., srs-ResourceSetToAddModList), that the first SRS resource set configured by the parameter associated with DCI format 0_2 is composed of the first $N_{SRS,0\_2}$ SRS resources in the SRS resource set configured by the parameter associated with DCI format 0_1, and the second SRS resource set configured by parameter associated with DCI format 0_2 does not have such a condition on SRS resources. When one SRS resource set is configured by a parameter associated with DCI format 0_2 and two SRS resource sets are configured by a parameter associated with DCI format 0_1, the SRS resource set configured by the parameter associated with DCI format 0_2 is composed of the first $N_{SRS,0\_2}$ SRS resources in the first SRS resource set configured by the parameter associated with DCI format 0_1.

Additionally, in some wireless communication systems, spatial division multiplexing (SDM) for uplink transmissions (e.g., PUSCH transmissions) may be specified. Here, different sets of layers may have different transmission parameters (e.g., different beams, different sets of power control parameters, different TPMIs, or the like), and there may be a variety of rank combinations supported (e.g., 1+1, 1+2, 2+1, or 2+2). In order to optimize a size (e.g., bitwidth) of SRIs, some constraint should imposed for SRS resources indication. In one example, a first SRI can be permitted to indicate from a first $N_{SRS\text{-}SDM}^1$ SRS resources in a first SRS resource set, and a second SRI can be permitted to indicate from a $N_{SRS\text{-}SDM}^2$ SRS resources in a second SRS resource set. In another example, the first SRI can be permitted to indicate at most $N_{SRS\text{-}SDM}^1$ SRS resources from the first SRS resource set, and the second SRI can be permitted to indicate at most $N_{SRS\text{-}SDM}^2$ SRS resources from the second SRS resource set.

Notably, details regarding operation of SDM for uplink transmissions scheduled using DCI format 0_2 need to be defined. More particularly, constraints on a number of SRS resources within each of two SRS resource sets for DCI format 0_2 need to be defined for an SDM uplink transmission scheduled using DCI format 0_2.

Some techniques and apparatuses described herein enable SDM uplink transmissions associated with SRS resource sets scheduled by DCI format 0_2. In some aspects, a base station may transmit, and a UE may receive, an SRS configuration indicating a first SRS resource set that includes $N_{SRS,0\_2}^1$ SRS resources and a second SRS resource set that includes $N_{SRS\text{-}SDM}^2$ SRS resources, where the first SRS resource set and the second SRS resource set are configured for uplink transmissions scheduled by a DCI format 0_2. Here, the $N_{SRS,0\_2}^1$ SRS resources of the first SRS resource set may be a first $N_{SRS\text{-}SDM}^1$ resources from a third SRS resource set that includes $N_{SRS}^1$ resources, and the $N_{SRS,0\_2}^2$ SRS resources of the second SRS resource set may be a first $N_{SRS,0\_2}^1$ resources from a fourth SRS resource set that includes $N_{SRS}^2$ resources. The third SRS resource set and the fourth SRS resource set are configured for uplink transmissions scheduled by DCI format 0_1, and $N_{SRS\text{-}SDM}^1$ SRS resources of the third SRS resource set and $N_{SRS\text{-}SDM}^2$ resources of the fourth SRS resource set are configured for SDM uplink communications scheduled by DCI format 0_1. In some aspects, the UE may transmit, and the base station may receive, an uplink transmission scheduled using DCI format 0_2, where the uplink transmission is transmitted based at least in part on the SRS configuration. Additional details are provided below.

As a result, operation of SDM for uplink transmissions scheduled using DCI format 0_2 can be supported. More particularly, the constraints on a number of SRS resources within each of two SRS resource sets for DCI format 0_2 are defined to enable SDM uplink transmissions scheduled using DCI format 0_2.

Figure 3A:
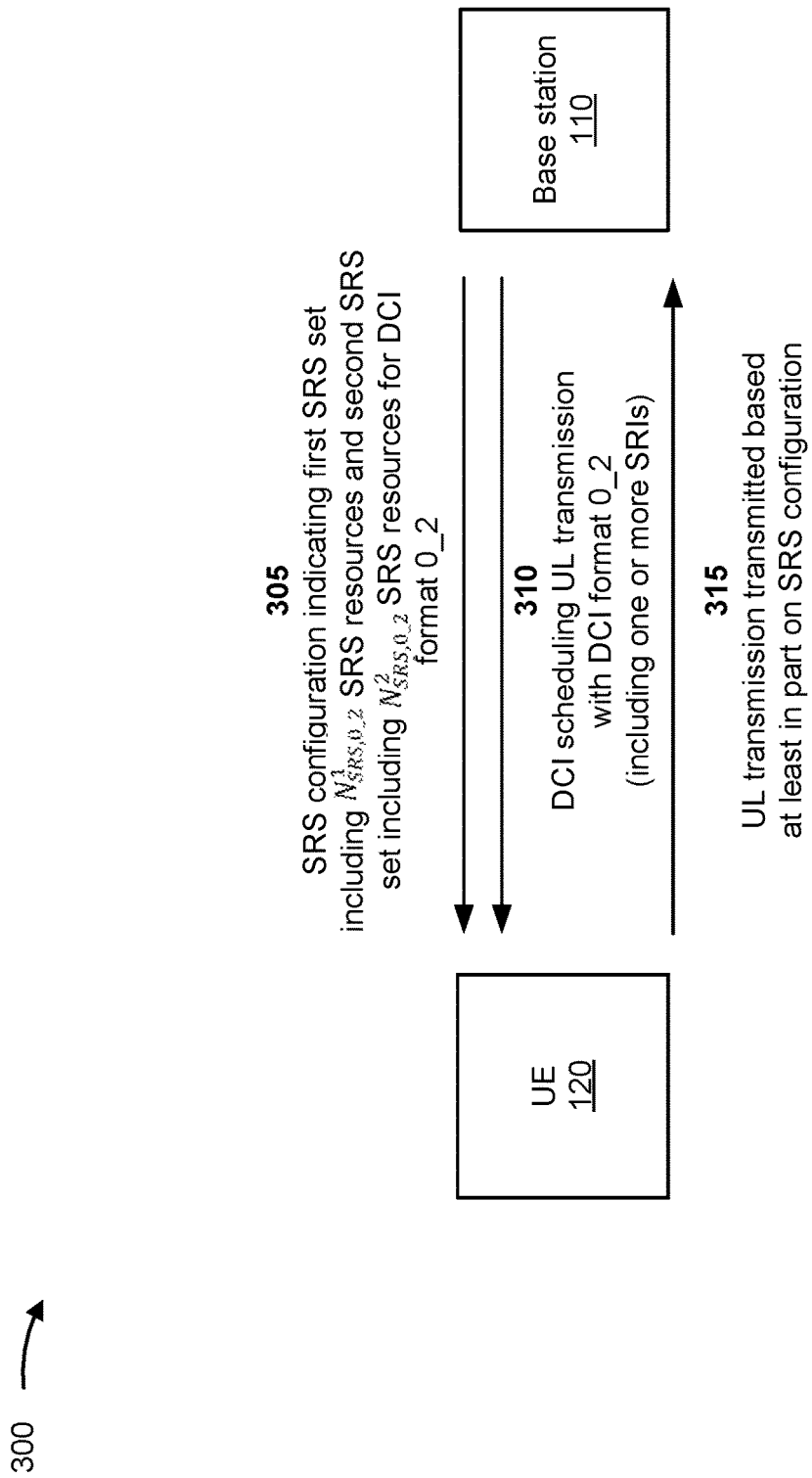
FIGS. 3A-3C are diagrams associated with spatial division multiplexed (SDM) uplink transmissions associated with sounding reference signal (SRS) resource sets scheduled by a downlink control information (DCI) format, in accordance with the present disclosure.
Figure 3B:
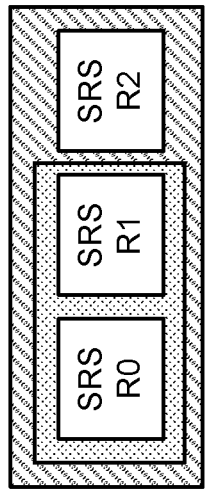
Figure 3B:
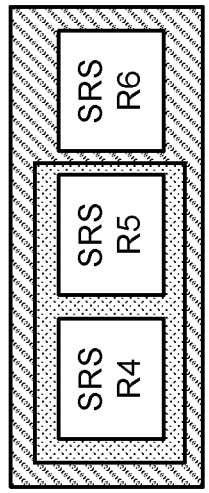
Figure 3B:
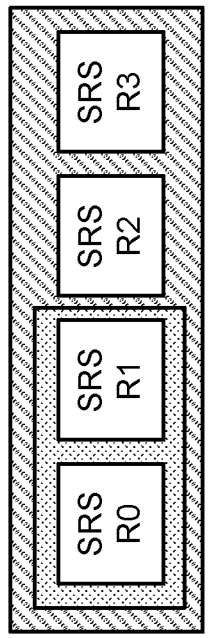
Figure 3B:
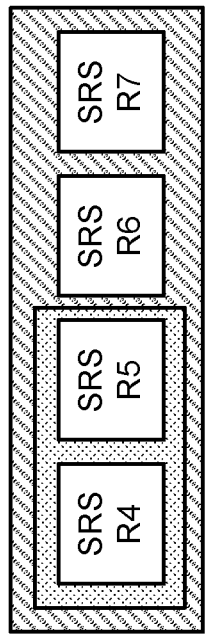
Figure 3C:
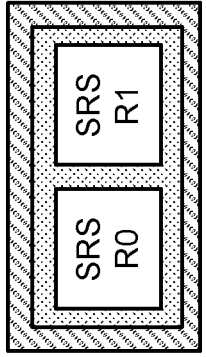
Figure 3C:
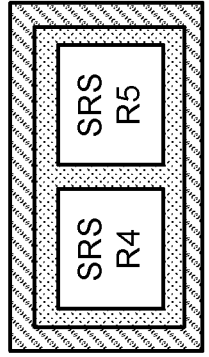
Figure 3C:
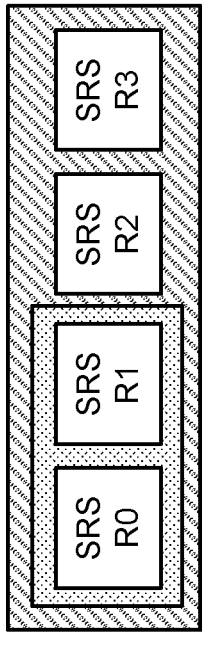
Figure 3C:
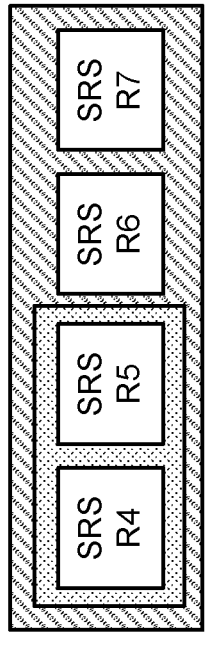

FIGS. 3A-3C are diagrams associated with SDM uplink transmissions associated with SRS resource sets scheduled by a DCI format, such as DCI format 0_2, in accordance with the present disclosure. As shown in FIG. 3A, example 300 includes communication between UE 120 and a base station 110. In some aspects, the base station 110 and the UE 120 may be included in a wireless network, such as wireless network 100. The base station 110 and the UE 120 may communicate via a wireless access link, which may include an uplink and a downlink.

As shown in FIG. 3A by reference 305, the base station 110 may transmit, and the UE 120 may receive, an SRS configuration indicating a first SRS resource set and a second SRS resource set. In some aspects, the first SRS resource set includes $N_{SRS,0\_2}^1$ SRS resources (e.g., $N_{SRS,0\_2}^1$ includes at least one SRS resource) and the second SRS resource set includes $N_{SRS,0\_2}^2$ SRS resources (e.g., $N_{SRS,0\_2}^2$ includes at least one SRS resource). In some aspects, as indicated in FIG. 3A, the first SRS resource set and the second SRS resource set are configured for uplink transmissions scheduled by a second DCI format, such as DCI format 0_2. That is, the base station 110 may transmit, and the UE 120 may receive, a configuration for SRS resource sets to be used for uplink transmissions (e.g., codebook-base PUSCH transmission, non-codebook-based PUSCH transmissions, or the like) scheduled by DCI format 0_2, where a number or SRS resources in the first SRS resource set and the second SRS resource set are $N_{SRS,0\_2}^1$ and $N_{SRS\text{-}SDM}^2$, respectively.

In some aspects, the $N_{SRS,0\_2}^1$ SRS resources of the first SRS resource set are a first $N_{SRS,0\_2}^1$ resources from a third SRS resource set that includes $N_{SRS}^1$ resources, the third SRS resource set being an SRS resource set configured for uplink transmissions scheduled by a first DCI format, such as DCI format 0_1. That is, in some aspects, the $N_{SRS,0\_2}^1$ SRS resources within the first SRS resource set configured for DCI format 0_2 are the first $N_{SRS,0\_2}^1$ resources within one SRS resource set configured for DCI format 0_1. Thus, in some aspects, $N_{SRS,0\_2}^1$ is less than or equal to $N_{SRS}^1$, meaning that the quantity of SRS resources in the first SRS resource set configured for DCI format 0_2 is less than or equal to the quantity of SRS resources in the SRS resource set configured for DCI format 0_1.

In some aspects, the $N_{SRS,0\_2}^2$ SRS resources of the second SRS resource set are a first $N_{SRS,0\_2}^1$ resources from a fourth SRS resource set that includes $N_{SRS}^2$ resources, the fourth SRS resource set being another SRS resource set configured for uplink transmissions scheduled by the first DCI format (e.g., DCI format 0_1). In some aspects, $N_{SRS,0\_2}^1$ is equal to $N_{SRS,0\_2}^2$, meaning that the quantity of SRS resources the SRS resource sets configured for DCI format 0_2 are equal. Therefore, in some aspects, the $N_{SRS,0\_2}^2$ SRS resources within the second SRS resource set configured for DCI format 0_2 are the first $N_{SRS,0\_2}^1$ resources within another SRS resource set associated with DCI format 0_1. In some aspects, $N_{SRS,0\_2}^2$ is less than or equal to $N_{SRS}^2$, meaning that the quantity of SRS resources in the second SRS resource set for DCI format 0_2 is less than or equal to the quantity of SRS resources in the other SRS resource set configured for DCI format 0_1.

In some aspects, the UE 120 is configured such that $N_{SRS\text{-}SDM}^1$ SRS resources of the third SRS resource set and $N_{SRS\text{-}SDM}^2$ resources of the fourth SRS resource set are to be used for SDM uplink communications scheduled by DCI format 0_1. That is, in some aspects, the UE 120 is configured such that $N_{SRS\text{-}SDM}^1$ SRS resources of one SRS resource set configured for DCI format 0_1 and $N_{SRS\text{-}SDM}^2$ resources of the other SRS resource set configured for DCI format 0_1 are to be used for SDM uplink communications scheduled by DCI format 0_1.

As shown by reference 310, in some aspects, an uplink transmission may be scheduled using DCI format 0_2 and based at least in part on the SRS configuration. For example, as shown in FIG. 3A, the base station 110 may transmit, and the UE 120 may receive, a DCI with DCI format 0_2, where the DCI includes one or more SRIs. Here, each SRI of the one or more SRIs may indicate one or more SRS resources based at least in part on which the uplink transmission is to be transmitted. For example, the base station 110 may transmit, and the UE 120 may receive, a DCI with format 0_2 scheduling an SDM PUSCH transmission, where the DCI includes a first SRI and a second SRI.

In some aspects, the first SRI is permitted to indicate SRS resources from a first group of SRS resources of the first SRS resource set and a second SRI is permitted to indicate SRS resources from a second group of SRS resources of the second SRS resource set. In one example, the first group of SRS resources comprises a first $N_{min}^1$, SRS resources of the first SRS resource set, with $N_{min}^1$, being a minimum of $N_{SRS\text{-}SDM}^1$ and $N_{SRS,0\_2}^1$. That is, in some aspects, for DCI format 0_2, the first SRI can only indicate from the first $\min(N_{SRS\text{-}SDM}^1, N_{SRS,0\_2}^1)$ SRS resources in the first SRS resource set. Similarly, in this example, the second group of SRS resources comprises a first $N_{min}^2$ SRS resources of the second SRS resource set, with $N_{min}^2$ being a minimum of $N_{SRS\text{-}SDM}^2$ and $N_{SRS,0\_2}^2$. That is, in some aspects, for DCI format 0_2, the second SRI can only indicate from the first $\min(N_{SRS\text{-}SDM}^2, N_{SRS,0\_2}^2)$ SRS resources in the second SRS resource set. In another example, the first group of SRS resources comprises a quantity of SRS resources that is less than or equal to a minimum of $N_{SRS\text{-}SDM}^1$ and $N_{SRS,0\_2}^1$ That is, in some aspects, for DCI format 0_2, the first SRI can indicate at most $\min(N_{SRS\text{-}SDM}^1, N_{SRS,0\_2}^1)$ SRS resources from the first SRS resource set. Similarly, the second group of SRS resources in this example comprises a quantity of SRS resources that is less than or equal to a minimum of $N_{SRS\text{-}SDM}^2$ and $N_{SRS,0\_2}^2$. That is, in some aspects, for DCI format 0_2, the second SRI can indicate at most $\min(N_{SRS\text{-}SDM}^2, N_{SRS,0\_2}^2)$ SRS resources from the second SRS resource set.

Alternatively, in some aspects, SRS resource sets for SDM uplink transmission scheduled by DCI format 0_1 and DCI format 0_2 can be configured separately. That is, quantities of SRS resources $N_{SRS\text{-}SDM}^1$ and $N_{SRS\text{-}SDM}^2$ associated with SDM uplink transmissions scheduled by DCI format 0_1 can be configured separately from quantities of SRS resources $N_{SRS\text{-}SDM,0\_2}^1$ and $N_{SRS\text{-}SDM,0\_2}^2$ associated with SDM uplink transmissions scheduled by DCI format 0_2. In one example of such an aspect, the first SRI is permitted to indicate SRS resources from a first $N_{SRS\text{-}SDM,0\_2}^1$ SRS resources of the first SRS resource set and a second SRI is permitted to indicate SRS resources from a first $N_{SRS\text{-}SDM,0\_2}^2$ SRS resources of the second SRS resource set. That is, in some aspects, for DCI format 0_2, the first SRI can only indicate from the first $N_{SRS\text{-}SDM,0\_2}^1$ SRS resources in the first SRS resource set (with $N_{SRS\text{-}SDM,0\_2}^1$ being less than or equal to $N_{SRS\text{-}SDM}^1$), and the second SRI can only indicate from the first $N_{SRS\text{-}SDM,0\_2}^2$ SRS resources in the second SRS resource set (with $N_{SRS\text{-}SDM,0\_2}^2$ being less than or equal to $N_{SRS\text{-}SDM}^2$). In another example, the first SRI is permitted to indicate up to $N_{SRS\text{-}SDM,0\_2}^1$ SRS resources of the first SRS resource set and a second SRI is permitted to indicate up to $N_{SRS\text{-}SDM,0\_2}^2$ SRS resources of the second SRS resource set. That is, in some aspects, for DCI format 0_2, the first SRI can indicate at most $N_{SRS\text{-}SDM,0\_2}^1$ SRS resources in the first SRS resource set (with $N_{SRS\text{-}SDM,0\_2}^1$ being less than or equal to $N_{SRS\text{-}SDM}^1$), and the second SRI can indicate at most $N_{SRS\text{-}SDM,0\_2}^2$ SRS resources in the second SRS resource set (with $N_{SRS\text{-}SDM,0\_2}^2$ being less than or equal to $N_{SRS\text{-}SDM}^2$).

Notably, in the above-described aspects and examples, a size (e.g., bitwidth) of a given SRI field in DCI format 0_2 is less or equal to a size of the corresponding SRI field in DCI format 0_1.

As shown by reference 315, the UE 120 may transmit, and the base station 110 may receive, an uplink transmission (e.g., an SDM uplink transmission) scheduled using DCI format 0_2. In some aspects, the UE 120 may transmit, and the base station 110 may receive, the uplink transmission based at least in part on the SRS configuration. For example, the base station 110 may transmit DCI with DCI format 0_2 and including one or more SRIs, as described above. The UE 120 may receive the DCI including the one or more SRIs, and the UE 120 may transmit the uplink transmission using the one or more SRS resources indicated by the one or more SRIs, as configured by the SRS configuration. In some aspects, the uplink transmission is a codebook-based transmission. In some aspects, the uplink transmission is a non-codebook-based transmission.

FIGS. 3B and 3C are diagrams illustrating examples of SRS resource set configuration and constraints for SRI indication, as described herein. In the examples shown in FIGS. 3B and 3C, one SRS resource set for uplink transmissions scheduled by DCI format 0_1 includes four SRS resources (e.g., $N_{SRS}^1=4$, including SRS resources 0 through 3) and another SRS resource set for uplink transmissions scheduled by DCI format 0_1 includes four SRS resources (e.g., $N_{SRS}^2=4$, including SRS resources 4 through 7).

In the example shown in FIG. 3B, configured SRS resource sets for SDM uplink transmission scheduled by DCI format 0_1 include two resources (e.g., $N_{SRS\text{-}SDM}^1=2$, including SRS resources 0 and 1; and $N_{SRS\text{-}SDM}^2=2$, including SRS resources 4 and 5). In this example, the first SRS resource set for configured for uplink transmissions scheduled by DCI format 0_2 includes three SRS resources (e.g., $N_{SRS,0\_2}^1=3$, including SRS resources 0 through 2). Similarly, the second SRS resource set for configured for uplink transmissions scheduled by DCI format 0_2 includes three SRS resources (e.g., $N_{SRS,0\_2}^2=3$, including SRS resources 4 through 6). Here, the first SRI transmitted in DCI format 0_2 in association with scheduling an SDM uplink transmission is permitted to indicate SRS resources from a first group of SRS resources of the first SRS resource set, where the first group of SRS resources comprises a first $N_{min}^1$ SRS resources of the first SRS resource set, with $N_{min}^1$ being a minimum of $N_{SRS\text{-}SDM}^1$ and $N_{SRS,0\_2}^1$. Here, the minimum of $N_{SRS\text{-}SDM}^1$ and $N_{SRS,0\_2}^1$ is 2, and so the first SRI can indicate SRS resources from among the first two SRS resources of the first SRS resource set (e.g., SRS resources 0 and 1). Further, the second SRI transmitted in DCI format 0_2 in association with scheduling the SDM uplink transmission is permitted to indicate SRS resources from a second group of SRS resources of the second SRS resource set, where the second group of SRS resources comprises a first $N_{min}^2$ SRS resources of the second SRS resource set, with $N_{min}^2$ being a minimum of $N_{SRS\text{-}SDM}^2$ and $N_{SRS,0\_2}^2$. Here, the minimum of NRS-SDM and $N_{SRS,0\_2}^2$ is 2, and so the second SRI can indicate SRS resources from among the first two SRS resources of the second SRS resource set (e.g., SRS resources 4 and 5).

In the example shown in FIG. 3C, configured SRS resource sets for SDM uplink transmission scheduled by DCI format 0_1 include two resources (e.g., $N_{SRS\text{-}SDM}^1=2$, including SRS resources 0 and 1; and $N_{SRS\text{-}SDM}^2=2$, including SRS resources 4 and 5). However, in this example, SRS resource sets for SDM uplink transmission scheduled by DCI format 0_2 are configured separately from SRS resource sets for SDM uplink transmission scheduled by DCI format 0_1. Here, one configured SRS resource set for SDM uplink transmission scheduled by DCI format 0_2 includes two resources (e.g., $N_{SRS\text{-}SDM,0\_2}^1=2$, including SRS resources 0 and 1) and another configured SRS resource set for SDM uplink transmission scheduled by DCI format 0_2 includes one resource (e.g., $N_{SRS\text{-}SDM,0\_2}^2=1$, including SRS resource 4). Further, in this example, the first SRS resource set for configured for uplink transmissions scheduled by DCI format 0_2 includes two SRS resources (e.g., $N_{SRS,0\_2}^1=2$, including SRS resources 0 and 1). Similarly, the second SRS resource set for configured for uplink transmissions scheduled by DCI format 0_2 includes two SRS resources (e.g., $N_{SRS,0\_2}^2=2$, including SRS resources 4 and 5). Here, the first SRI transmitted in DCI format 0_2 in association with scheduling an SDM uplink transmission can indicate SRS resources from a first $N_{SRS\text{-}SDM,0\_2}^1$ SRS resources of the first SRS resource set, and so the first SRI can indicate from among the two resources of the first SRS resource set (e.g., SRS resources 0 and 1). Further, the second SRI transmitted in DCI format 0_2 in association with scheduling an SDM uplink transmission can indicate SRS resources from a first $N_{SRS\text{-}SDM,0\_2}^2$ SRS resources of the first SRS resource set, and so the second SRI can indicate the first SRS resource of the second SRS resource set (e.g., SRS resource 4).

As indicated above, FIGS. 3A-3C provided as examples. Other examples may differ from what is described with respect to FIGS. 3A-3C.

Figure 4:
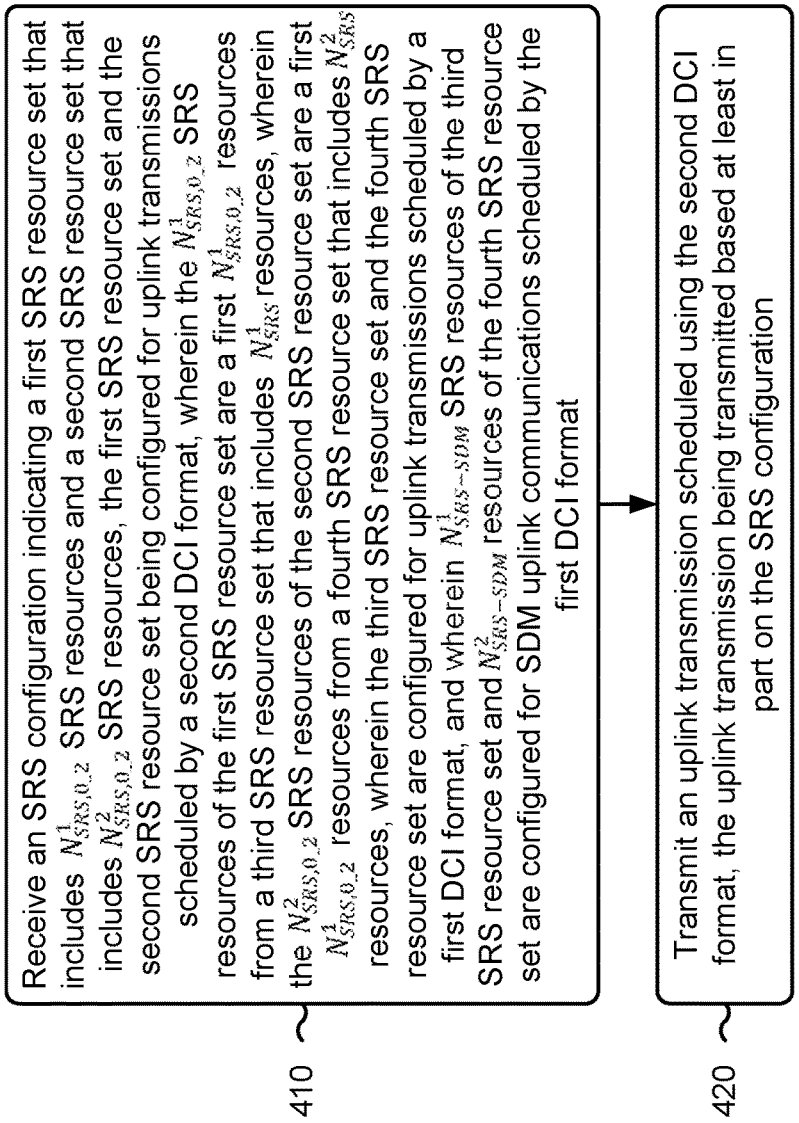
FIGS. 4 and 5 are diagrams illustrating example processes associated with SDM uplink transmissions associated with SRS resource sets scheduled by a DCI format, in accordance with the present disclosure.

FIG. 4 is a diagram illustrating an example process 400 performed, for example, by a UE, in accordance with the present disclosure. Example process 400 is an example where the UE (e.g., UE 120) performs operations associated with techniques for SDM uplink transmissions associated with SRS resource sets scheduled by a DCI format.

As shown in FIG. 4, in some aspects, process 400 may include receiving an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format (block 410). For example, the UE (e.g., using communication manager 140 and/or reception component 602, depicted in FIG. 6) may receive an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, as described above. In some aspects, the $N_{SRS,0\_2}^1$ SRS resources of the first SRS resource set are a first $N_{SRS,0\_2}^1$ resources from a third SRS resource set that includes $N_{SRS}^1$ resources. In some aspects, the $N_{SRS,0\_2}^2$ SRS resources of the second SRS resource set are a first $N_{SRS,0\_2}^1$ resources from a fourth SRS resource set that includes $N_{SRS}^2$ resources. In some aspects, the third SRS resource set and the fourth SRS resource set are configured for uplink transmissions scheduled by a first DCI format. In some aspects, $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format.

As further shown in FIG. 4, process 400 may include transmitting an uplink transmission scheduled using the second DCI format, the uplink transmission being transmitted based at least in part on the SRS configuration (block 420). For example, the UE (e.g., using communication manager 140 and/or transmission component 604, depicted in FIG. 6) may transmit an uplink transmission scheduled using the second DCI format, the uplink transmission being transmitted based at least in part on the SRS configuration, as described above.

Process 400 may include additional aspects, such as any single aspect or any combination of aspects described below and/or in connection with one or more other processes described elsewhere herein.

In a first aspect, the first group of SRS resources comprises a first $N_{min}^1$ SRS resources of the first SRS resource set, $N_{min}^1$, being a minimum of $N_{SRS\text{-}SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS\text{-}SDM}^2$ and $N_{SRS,0\_2}^2$.

In a second aspect, alone or in combination with the first aspect, the first group of SRS resources comprises a quantity of SRS resources that is less than or equal to a minimum of $N_{SRS\text{-}SDM}^1$ and $N_{SRS,0\_2}^1$, and wherein the second group of SRS resources comprises a quantity of SRS resources that is less than or equal to a minimum of $N_{SRS\text{-}SDM}^2$ and $N_{SRS,0\_2}^2$.

In a third aspect, alone or in combination with one or more of the first and second aspects, $N_{SRS\text{-}SDM,0\_2}^1$ is less than or equal to $N_{SRS\text{-}SDM}^1$ and $N_{SRS\text{-}SDM,0\_2}^2$ is less than or equal to $N_{SRS\text{-}SDM}^2$, and wherein $N_{SRS\text{-}SDM,0\_2}^1$ and $N_{SRS\text{-}SDM,0\_2}^2$ are configured separately from $N_{SRS\text{-}SDM}^1$ and $N_{SRS\text{-}SDM}^2$.

In a fourth aspect, alone or in combination with one or more of the first through third aspects, $N_{SRS\text{-}SDM,0\_2}^1$ is less than or equal to $N_{SRS\text{-}SDM}^1$ and $N_{SRS\text{-}SDM,0\_2}^2$ is less than or equal to $N_{SRS\text{-}SDM}^2$, and wherein $N_{SRS\text{-}SDM,0\_2}^1$ and $N_{SRS\text{-}SDM,0\_2}^1$ are configured separately from $N_{SRS\text{-}SDM}^1$ and $N_{SRS\text{-}SDM}^2$.

In a fifth aspect, alone or in combination with one or more of the first through fourth aspects, the first DCI format is DCI format 0_1 and the second DCI format is DCI format 0_2.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
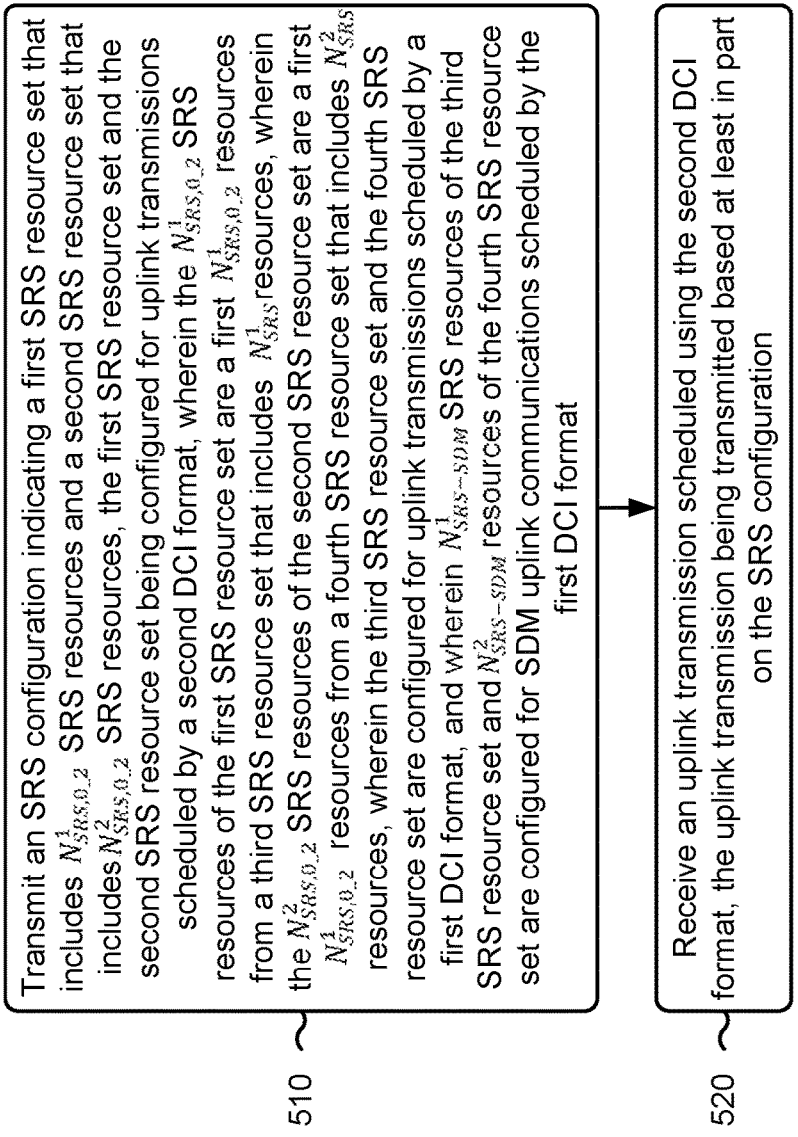

FIG. 5 is a diagram illustrating an example process 500 performed, for example, by a base station, in accordance with the present disclosure. Example process 500 is an example where the base station (e.g., base station 110) performs operations associated with techniques for SDM uplink transmissions associated with SRS resource set scheduled by a DCI format.

As shown in FIG. 5, in some aspects, process 500 may include transmitting an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format (block 510). For example, the base station (e.g., using communication manager 150 and/or transmission component 704, depicted in FIG. 7) may transmit an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, as described above. In some aspects, the $N_{SRS,0\_2}^1$ SRS resources of the first SRS resource set are a first $N_{SRS,0\_2}^1$ resources from a third SRS resource set that includes $N_{SRS}^1$ resources. In some aspects, the $N_{SRS,0\_2}^2$ SRS resources of the second SRS resource set are a first $N_{SRS,0\_2}^1$ resources from a fourth SRS resource set that includes $N_{SRS}^2$ resources. In some aspects, the third SRS resource set and the fourth SRS resource set are configured for uplink transmissions scheduled by a first DCI format. In some aspects, $N_{SRS-SDM}^1$ SRS resources of the third SRS resource set and $N_{SRS-SDM}^2$ resources of the fourth SRS resource set are configured for SDM uplink communications scheduled by the first DCI format.

As further shown in FIG. 5, in some aspects, process 500 may include receiving an uplink transmission scheduled using the second DCI format, the uplink transmission being received based at least in part on the SRS configuration (block 520). For example, the base station (e.g., using communication manager 150 and/or reception component 702, depicted in FIG. 7) may receive an uplink transmission scheduled using the second DCI format, the uplink transmission being received based at least in part on the SRS configuration, as described above.

Process 500 may include additional aspects, such as any single aspect or any combination of aspects described below and/or in connection with one or more other processes described elsewhere herein.

In a first aspect, the first group of SRS resources comprises a first $N_{min}^1$ SRS resources of the first SRS resource set, $N_{min}^1$ being a minimum of $N_{SRS-SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS-SDM}^2$ and $N_{SRS,0\_2}^2$.

In a second aspect, alone or in combination with the first aspect, the first group of SRS resources comprises a quantity of SRS resources that is less than or equal to a minimum of $N_{SRS-SDM}^1$ and $N_{SRS,0\_2}^1$, and wherein the second group of SRS resources comprises a quantity of SRS resources that is less than or equal to a minimum of $N_{SRS-SDM}^2$ and $N_{SRS,0\_2}^2$.

In a third aspect, alone or in combination with one or more of the first and second aspects, $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

In a fourth aspect, alone or in combination with one or more of the first through third aspects, $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

In a fifth aspect, alone or in combination with one or more of the first through fourth aspects, the first DCI format is DCI format 0_1 and the second DCI format is DCI format 0_2.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
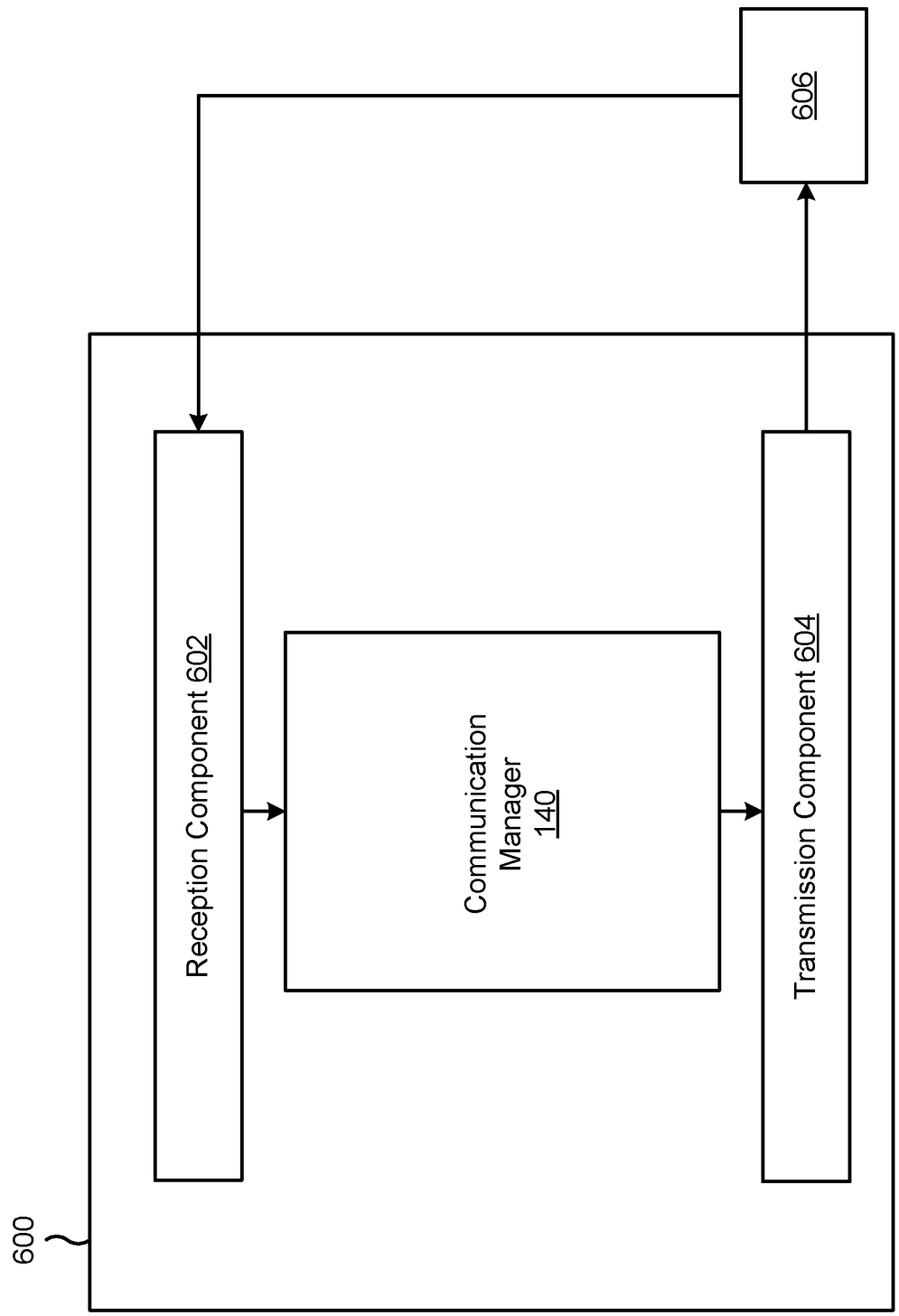
FIGS. 6 and 7 are diagrams of example apparatuses for wireless communication, in accordance with the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140.

In some aspects, the apparatus 600 may be configured to perform one or more operations described herein in connection with FIGS. 3A-3C. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format. In some aspects, the $N_{SRS,0\_2}^1$ SRS resources of the first SRS resource set are a first $N_{SRS,0\_2}^1$ resources from a third SRS resource set that includes $N_{SRS}^1$ resources. In some aspects, the $N_{SRS,0\_2}^2$ SRS resources of the second SRS resource set are a first $N_{SRS,0\_2}^1$ resources from a fourth SRS resource set that includes $N_{SRS}^2$ resources. In some aspects, the third SRS resource set and the fourth SRS resource set are configured for uplink transmissions scheduled by a first DCI format. In some aspects, $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format. The transmission component 604 may transmit an uplink transmission scheduled using the second DCI format, the uplink transmission being transmitted based at least in part on the SRS configuration.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
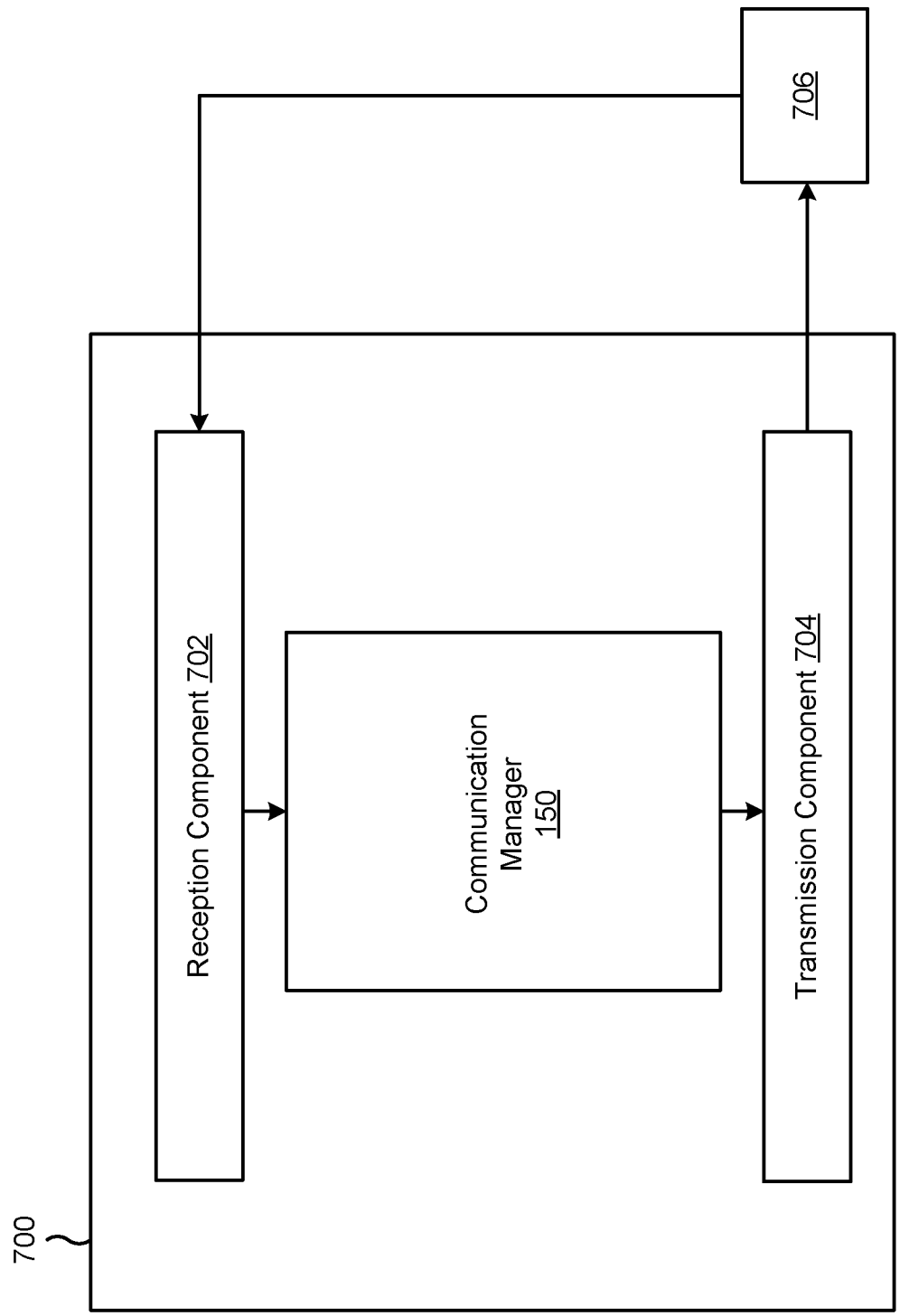

FIG. 7 is a diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 150.

In some aspects, the apparatus 700 may be configured to perform one or more operations described herein in connection with FIGS. 3A-3C. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the base station described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the base station described in connection with FIG. 2. In some aspects, the transmission component 704 may be co-located with the reception component 702 in a transceiver.

The transmission component 704 may transmit an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format. In some aspects, the $N_{SRS,0\_2}^1$ SRS resources of the first SRS resource set are a first $N_{SRS,0\_2}^1$ resources from a third SRS resource set that includes $N_{SRS}^1$ resources. In some aspects, the $N_{SRS,0\_2}^2$ SRS resources of the second SRS resource set are a first $N_{SRS,0\_2}^1$ resources from a fourth SRS resource set that includes $N_{SRS}^2$ resources. In some aspects, the third SRS resource set and the fourth SRS resource set are configured for uplink transmissions scheduled by a first DCI format. In some aspects, $N_{SRS\text{-}SDM}^1$ SRS resources of the third SRS resource set and $N_{SRS\text{-}SDM}^2$ resources of the fourth SRS resource set are configured for SDM uplink communications scheduled by the first DCI format. The reception component 702 may receive an uplink transmission scheduled using the second DCI format, the uplink transmission being received based at least in part on the SRS configuration.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: receiving an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, wherein the $N_{SRS,0\_2}^1$ SRS resources of the first SRS resource set are a first $N_{SRS,0\_2}^1$ resources from a third SRS resource set that includes $N_{SRS}^2$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for SDM uplink communications scheduled by the first DCI format; and transmitting an uplink transmission scheduled using the second DCI format, the uplink transmission being transmitted based at least in part on the SRS configuration.

Aspect 2: The method of Aspect 1, wherein, for the second DCI format, a first SRI is permitted to indicate SRS resources from a first group of SRS resources of the first SRS resource set and a second SRI is permitted to indicate SRS resources from a second group of SRS resources of the second SRS resource set, wherein the first group of SRS resources comprises a first $N_{min}^1$ SRS resources of the first SRS resource set, $N_{min}^1$ being a minimum of $N_{SRS-SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS-SDM}^2$ and $N_{SRS,0\_2}^2$.

Aspect 3: The method of any of Aspects 1 and 2, wherein, for the second DCI format, a first SRI is permitted to indicate SRS resources from a first group of SRS resources of the first SRS resource set and a second SRI is permitted to indicate SRS resources in a second group of SRS resources of the second SRS resource set, wherein the first group of SRS resources comprises a quantity of SRS resources that is less than or equal to a minimum of $N_{SRS-SDM}^1$ and $N_{SRS,0\_2}^1$, and wherein the second group of SRS resources comprises a quantity of SRS resources that is less than or equal to a minimum of $N_{SRS-SDM}^2$ and $N_{SRS,0\_2}^2$.

Aspect 4: The method of Aspect 1, wherein, for the second DCI format, a first SRI is permitted to indicate SRS resources from a first $N_{SRS-SDM,0\_2}^1$ SRS resources of the first SRS resource set and a second SRI is permitted to indicate SRS resources from a first $N_{SRS-SDM,0\_2}^2$ SRS resources of the second SRS resource set, wherein $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

Aspect 5: The method of any of Aspects 1 and 4, wherein, for the second DCI format, a first SRI is permitted to indicate up to $N_{SRS-SDM,0\_2}^1$ SRS resources of the first SRS resource set and a second SRI is permitted to indicate up to $N_{SRS-SDM,0\_2}^2$ SRS resources of the second SRS resource set, wherein $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

Aspect 6: The method of any of Aspects 1-5, wherein the first DCI format is DCI format 0_1 and the second DCI format is DCI format 0_2.

Aspect 7: A method of wireless communication performed by a base station, comprising: transmitting an SRS configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second DCI format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^1$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for SDM uplink communications scheduled by the first DCI format; and receiving an uplink transmission scheduled using the second DCI format, the uplink transmission being received based at least in part on the SRS configuration.

Aspect 8: The method of Aspect 7, wherein, for the second DCI format, a first SRI is permitted to indicate SRS resources from a first group of SRS resources of the first SRS resource set and a second SRI is permitted to indicate SRS resources from a second group of SRS resources of the second SRS resource set, wherein the first group of SRS resources comprises a first $N_{min}^1$ SRS resources of the first SRS resource set, $N_{min}^1$ being a minimum of $N_{SRS-SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS-SDM}^2$ and $N_{SRS,0\_2}^2$.

Aspect 9: The method of any of Aspects 7 and 8, wherein, for the second DCI format, a first SRI is permitted to indicate SRS resources from a first group of SRS resources of the first SRS resource set and a second SRI is permitted to indicate SRS resources in a second group of SRS resources of the second SRS resource set, wherein the first group of SRS resources comprises a quantity of SRS resources that is less than or equal to a minimum of $N_{SRS-SDM}^1$ and $N_{SRS,0\_2}^1$, and wherein the second group of SRS resources comprises a quantity of SRS resources that is less than or equal to a minimum of $N_{SRS-SDM}^2$ and $N_{SRS,0\_2}^2$.

Aspect 10: The method of Aspect 7, wherein, for the second DCI format, a SRI is permitted to indicate SRS resources from a first $N_{SRS-SDM,0\_2}^1$ SRS resources of the first SRS resource set and a second SRI is permitted to indicate SRS resources from a first $N_{SRS-SDM,0\_2}^2$ SRS resources of the second SRS resource set, wherein $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

Aspect 11: The method of any of Aspects 7 and 10, wherein, for the second DCI format, a first SRI is permitted to indicate up to $N_{SRS-SDM,0\_2}^1$ SRS resources of the first SRS resource set and a second SRI is permitted to indicate up to $N_{SRS-SDM,0\_2}^2$ SRS resources of the second SRS resource set, wherein $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

Aspect 12: The method of any of Aspects 7-11, wherein the first DCI format is DCI format 0_1 and the second DCI format is DCI format 0_2.

Aspect 13: An apparatus for wireless communication at a device, comprising a processor; memory coupled with the processor; and instructions stored in the memory and executable by the processor to cause the apparatus to perform the method of one or more of Aspects 1-6.

Aspect 14: A device for wireless communication, comprising a memory and one or more processors coupled to the memory, the one or more processors configured to perform the method of one or more of Aspects 1-6.

Aspect 15: An apparatus for wireless communication, comprising at least one means for performing the method of one or more of Aspects 1-6.

Aspect 16: A non-transitory computer-readable medium storing code for wireless communication, the code comprising instructions executable by a processor to perform the method of one or more of Aspects 1-6.

Aspect 17: A non-transitory computer-readable medium storing a set of instructions for wireless communication, the set of instructions comprising one or more instructions that, when executed by one or more processors of a device, cause the device to perform the method of one or more of Aspects 1-6.

Aspect 18: An apparatus for wireless communication at a device, comprising a processor; memory coupled with the processor; and instructions stored in the memory and executable by the processor to cause the apparatus to perform the method of one or more of Aspects 7-12.

Aspect 19: A device for wireless communication, comprising a memory and one or more processors coupled to the memory, the one or more processors configured to perform the method of one or more of Aspects 7-12.

Aspect 20: An apparatus for wireless communication, comprising at least one means for performing the method of one or more of Aspects 7-12.

Aspect 21: A non-transitory computer-readable medium storing code for wireless communication, the code comprising instructions executable by a processor to perform the method of one or more of Aspects 7-12.

Aspect 22: A non-transitory computer-readable medium storing a set of instructions for wireless communication, the set of instructions comprising one or more instructions that, when executed by one or more processors of a device, cause the device to perform the method of one or more of Aspects 7-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive a sounding reference signal (SRS) configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second downlink control information (DCI) format,
        wherein the $N_{SRS,0\_2}^1$ SRS resources of the first SRS resource set are a first $N_{SRS,0\_2}^1$ resources from a third SRS resource set that includes $N_{SRS}^1$ resources,
        wherein the $N_{SRS,0\_2}^2$ SRS resources of the second SRS resource set are a first $N_{SRS,0\_2}^1$ resources from a fourth SRS resource set that includes $N_{SRS}^2$ resources,
        wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for spatial division multiplexed (SDM) uplink communications scheduled by the first DCI format; and transmit an uplink transmission scheduled using the second DCI format, the uplink transmission being transmitted based at least in part on the SRS configuration.

2. The UE of claim 1, wherein, for the second DCI format, a first SRS resource indicator (SRI) is permitted to indicate SRS resources from a first group of SRS resources of the first SRS resource set and a second SRI is permitted to indicate SRS resources from a second group of SRS resources of the second SRS resource set, wherein the first group of SRS resources comprises a first $N_{min}^1$ SRS resources of the first SRS resource set, $N_{min}^1$ being a minimum of $N_{SRS-SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS-SDM}^2$ and $N_{SRS,0\_2}^2$.

3. The UE of claim 1, wherein, for the second DCI format, a first SRS resource indicator (SRI) is permitted to indicate SRS resources from a first group of SRS resources of the first SRS resource set and a second SRI is permitted to indicate SRS resources in a second group of SRS resources of the second SRS resource set, wherein the first group of SRS resources comprises a quantity of SRS resources that is less than or equal to a minimum of $N_{SRS-SDM}^1$ and $N_{SRS,0\_2}^1$, and wherein the second group of SRS resources comprises a quantity of SRS resources that is less than or equal to a minimum of $N_{SRS-SDM}^2$ and $N_{SRS,0\_2}^2$.

4. The UE of claim 1, wherein, for the second DCI format, a first SRS resource indicator (SRI) is permitted to indicate SRS resources from a first $N_{SRS-SDM,0\_2}^1$ resources of the first SRS resource set and a second SRI is permitted to indicate SRS resources from a first $N_{SRS-SDM,0\_2}^2$ SRS resources of the second SRS resource set, wherein $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

5. The UE of claim 1, wherein, for the second DCI format, a first SRS resource indicator (SRI) is permitted to indicate up to $N_{SRS-SDM,0\_2}^1$ SRS resources of the first SRS resource set and a second SRI is permitted to indicate up to $N_{SRS-SDM,0\_2}^2$ SRS resources of the second SRS resource set, wherein $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

6. The UE of claim 1, wherein the first DCI format is DCI format 0_1 and the second DCI format is DCI format 0_2.

7. A base station for wireless communication, comprising:
a memory; and
one or more processors, coupled to the memory, configured to:
transmit a sounding reference signal (SRS) configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second downlink control information (DCI) format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS-SDM}^1$ SRS resources of the third SRS resource set and $N_{SRS-SDM}^2$ resources of the fourth SRS resource set are configured for spatial division multiplexed (SDM) uplink communications scheduled by the first DCI format; and receive an uplink transmission scheduled using the second DCI format, the uplink transmission being received based at least in part on the SRS configuration.

8. The base station of claim 7, wherein, for the second DCI format, a first SRS resource indicator (SRI) is permitted to indicate SRS resources from a first group of SRS resources of the first SRS resource set and a second SRI is permitted to indicate SRS resources from a second group of SRS resources of the second SRS resource set, wherein the first group of SRS resources comprises a first $N_{min}^1$ SRS resources of the first SRS resource set, $N_{min}^1$ being a minimum of $N_{SRS-SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS-SDM}^2$ and $N_{SRS,0\_2}^2$.

9. The base station of claim 7, wherein, for the second DCI format, a first SRS resource indicator (SRI) is permitted to indicate SRS resources from a first group of SRS resources of the first SRS resource set and a second SRI is permitted to indicate SRS resources in a second group of SRS resources of the second SRS resource set, wherein the first group of SRS resources comprises a quantity of SRS resources that is less than or equal to a minimum of $N_{SRS-SDM}^1$ and $N_{SRS,0\_2}^1$, and wherein the second group of SRS resources comprises a quantity of SRS resources that is less than or equal to a minimum of $N_{SRS-SDM}^2$ and $N_{SRS,0\_2}^2$.

10. The base station of claim 7, wherein, for the second DCI format, a first SRS resource indicator (SRI) is permitted to indicate SRS resources from a first $N_{SRS-SDM,0\_2}^1$ SRS resources of the first SRS resource set and a second SRI is permitted to indicate SRS resources from a first $N_{SRS-SDM,0\_2}^2$ SRS resources of the second SRS resource set, wherein $N_{SRS-SDM,0\_2}^1$ is less than or equal to $N_{SRS-SDM}^1$ and $N_{SRS-SDM,0\_2}^2$ is less than or equal to $N_{SRS-SDM}^2$, and wherein $N_{SRS-SDM,0\_2}^1$ and $N_{SRS-SDM,0\_2}^2$ are configured separately from $N_{SRS-SDM}^1$ and $N_{SRS-SDM}^2$.

11. The base station of claim 7, wherein, for the second DCI format, a first SRS resource indicator (SRI) is permitted to indicate up to $N_{SRS-SDM,0\_2}^1$ SRS resources of the first SRS resource set and a second SRI is permitted to indicate up to $N_{SRS-SDM,0\_2}^2$ SRS resources of the second SRS resource set, wherein $N_{SRS\text{-}SDM,0\_2}^1$ is less than or equal to $N_{SRS\text{-}SDM}^1$ and $N_{SRS\text{-}SDM,0\_2}^2$ is less than or equal to $N_{SRS\text{-}SDM}^2$, and wherein $N_{SRS\text{-}SDM,0\_2}^1$ and $N_{SRS\text{-}SDM,0\_2}^2$ are configured separately from $N_{SRS\text{-}SDM}^1$ and $N_{SRS\text{-}SDM}^2$.

12. The base station of claim 7, wherein the first DCI format is DCI format 0_1 and the second DCI format is DCI format 0_2.

13. A method of wireless communication performed by a user equipment (UE), comprising:

receiving a sounding reference signal (SRS) configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second downlink control information (DCI) format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS\text{-}SDM}^1$ SRS resources of the third SRS resource set and $N_{SRS\text{-}SDM}^2$ resources of the fourth SRS resource set are configured for spatial division multiplexed (SDM) uplink communications scheduled by the first DCI format; and transmitting an uplink transmission scheduled using the second DCI format, the uplink transmission being transmitted based at least in part on the SRS configuration.

14. The method of claim 13, wherein, for the second DCI format, a first SRS resource indicator (SRI) is permitted to indicate SRS resources from a first group of SRS resources of the first SRS resource set and a second SRI is permitted to indicate SRS resources from a second group of SRS resources of the second SRS resource set, wherein the first group of SRS resources comprises a first $N_{min}^1$ SRS resources of the first SRS resource set, $N_{min}^1$ being a minimum of $N_{SRS\text{-}SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS\text{-}SDM}^2$ and $N_{SRS,0\_2}^2$.

15. The method of claim 13, wherein, for the second DCI format, a first SRS resource indicator (SRI) is permitted to indicate SRS resources from a first group of SRS resources of the first SRS resource set and a second SRI is permitted to indicate SRS resources in a second group of SRS resources of the second SRS resource set, wherein the first group of SRS resources comprises a quantity of SRS resources that is less than or equal to a minimum of $N_{SRS\text{-}SDM}^1$ and $N_{SRS,0\_2}^1$, and wherein the second group of SRS resources comprises a quantity of SRS resources that is less than or equal to a minimum of $N_{SRS\text{-}SDM}^2$ and $N_{SRS,0\_2}^2$.

16. The method of claim 13, wherein, for the second DCI format, a first SRS resource indicator (SRI) is permitted to indicate SRS resources from a first $N_{SRS\text{-}SDM,0\_2}^1$ SRS resources of the first SRS resource set and a second SRI is permitted to indicate SRS resources from a first $N_{SRS\text{-}SDM,0\_2}^2$ SRS resources of the second SRS resource set, wherein $N_{SRS\text{-}SDM,0\_2}^1$ is less than or equal to $N_{SRS\text{-}SDM}^1$ and $N_{SRS\text{-}SDM,0\_2}^2$ is less than or equal to $N_{SRS\text{-}SDM}^2$, and wherein $N_{SRS\text{-}SDM,0\_2}^1$ and $N_{SRS\text{-}SDM,0\_2}^2$ are configured separately from $N_{SRS\text{-}SDM}^1$ and $N_{SRS\text{-}SDM}^2$.

17. The method of claim 13, wherein, for the second DCI format, a first SRS resource indicator (SRI) is permitted to indicate up to $N_{SRS\text{-}SDM,0\_2}^1$ SRS resources of the first SRS resource set and a second SRI is permitted to indicate up to $N_{SRS\text{-}SDM,0\_2}^2$ SRS resources of the second SRS resource set, wherein $N_{SRS\text{-}SDM,0\_2}^1$ is less than or equal to $N_{SRS\text{-}SDM}^1$ and $N_{SRS\text{-}SDM,0\_2}^2$ is less than or equal to $N_{SRS\text{-}SDM}^2$, and wherein $N_{SRS\text{-}SDM,0\_2}^1$ and $N_{SRS\text{-}SDM,0\_2}^2$ are configured separately from $N_{SRS\text{-}SDM}^1$ and $N_{SRS\text{-}SDM}^2$.

18. The method of claim 13, wherein the first DCI format is DCI format 0_1 and the second DCI format is DCI format 0_2.

19. A method of wireless communication performed by a base station, comprising:

transmitting a sounding reference signal (SRS) configuration indicating a first SRS resource set that includes $N_{SRS,0\_2}^1$ SRS resources and a second SRS resource set that includes $N_{SRS,0\_2}^2$ SRS resources, the first SRS resource set and the second SRS resource set being configured for uplink transmissions scheduled by a second downlink control information (DCI) format, wherein the $N_{SRS,0\_2}^1$ SRS resources of the first SRS resource set are a first $N_{SRS,0\_2}^1$ resources from a third SRS resource set that includes $N_{SRS}^1$ resources, wherein the $N_{SRS,0\_2}^2$ SRS resources of the second SRS resource set are a first $N_{SRS,0\_2}^1$ resources from a fourth SRS resource set that includes $N_{SRS}^2$ resources, wherein the third SRS resource set and the fourth SRS resource set are configured for uplink transmissions scheduled by a first DCI format, and wherein $N_{SRS\text{-}SDM}^1$ SRS resources of the third SRS resource set and $N_{SRS\text{-}SDM}^2$ resources of the fourth SRS resource set are configured for spatial division multiplexed (SDM) uplink communications scheduled by the first DCI format; and receiving an uplink transmission scheduled using the second DCI format, the uplink transmission being received based at least in part on the SRS configuration.

20. The method of claim 19, wherein, for the second DCI format, a first SRS resource indicator (SRI) is permitted to indicate SRS resources from a first group of SRS resources of the first SRS resource set and a second SRI is permitted to indicate SRS resources from a second group of SRS resources of the second SRS resource set, wherein the first group of SRS resources comprises a first $N_{min}^1$ SRS resources of the first SRS resource set, $N_{min}^1$ being a minimum of $N_{SRS\text{-}SDM}^1$ and $N_{SRS,0\_2}^1$, and wherein the second group of SRS resources comprises a first $N_{min}^2$ SRS resources of the second SRS resource set, $N_{min}^2$ being a minimum of $N_{SRS\text{-}SDM}^2$ and $N_{SRS,0\_2}^2$.

21. The method of claim 19, wherein, for the second DCI format, a first SRS resource indicator (SRI) is permitted to indicate SRS resources from a first group of SRS resources of the first SRS resource set and a second SRI is permitted to indicate SRS resources in a second group of SRS resources of the second SRS resource set, wherein the first group of SRS resources comprises a quantity of SRS resources that is less than or equal to a minimum of $N_{SRS\text{-}SDM}^1$ and $N_{SRS,0\_2}^1$, and wherein the second group of SRS resources comprises a quantity of SRS resources that is less than or equal to a minimum of $N_{SRS\text{-}SDM}^2$ and $N_{SRS,0\_2}^2$.

22. The method of claim 19, wherein, for the second DCI format, a first SRS resource indicator (SRI) is permitted to indicate SRS resources from a first $N_{SRS\text{-}SDM,0\_2}^1$ SRS resources of the first SRS resource set and a second SRI is permitted to indicate SRS resources from a first $N_{SRS\text{-}SDM,0\_2}^2$ SRS resources of the second SRS resource set, wherein $N_{SRS\text{-}SDM,0\_2}^1$ is less than or equal to $N_{SRS\text{-}SDM}^1$ and $N_{SRS\text{-}SDM,0\_2}^2$ is less than or equal to $N_{SRS\text{-}SDM}^2$, and wherein $N_{SRS\text{-}SDM,0\_2}^1$ and $N_{SRS\text{-}SDM,0\_2}^2$ are configured separately from $N_{SRS\text{-}SDM}^1$ and $N_{SRS\text{-}SDM}^2$.

23. The method of claim 19, wherein, for the second DCI format, a first SRS resource indicator (SRI) is permitted to indicate up to $N_{SRS\text{-}SDM,0\_2}^1$ SRS resources of the first SRS resource set and a second SRI is permitted to indicate up to $N_{SRS\text{-}SDM,0\_2}^2$ SRS resources of the second SRS resource set, wherein $N_{SRS\text{-}SDM,0\_2}^1$ is less than or equal to $N_{SRS\text{-}SDM}^1$ and $N_{SRS\text{-}SDM,0\_2}^2$ is less than or equal to $N_{SRS\text{-}SDM}^2$, and wherein $N_{SRS\text{-}SDM,0\_2}^1$ and $N_{SRS\text{-}SDM,0\_2}^2$ are configured separately from $N_{SRS\text{-}SDM}^1$ and $N_{SRS\text{-}SDM}^2$.

24. The method of claim 19, wherein the first DCI format is DCI format 0_1 and the second DCI format is DCI format 0_2.

* * * * *